US008626557B2

(12) United States Patent
Garrett et al.

(10) Patent No.: US 8,626,557 B2
(45) Date of Patent: Jan. 7, 2014

(54) SYSTEM AND METHOD OF PROVIDING SNAPSHOT TO SUPPORT APPROVAL OF WORKFLOW CHANGES

(75) Inventors: Andrew J. Garrett, Abbots Langley (GB); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1981 days.

(21) Appl. No.: 11/535,176

(22) Filed: Sep. 26, 2006

(65) Prior Publication Data

US 2008/0077466 A1 Mar. 27, 2008

(51) Int. Cl.
*G06Q 10/00* (2012.01)

(52) U.S. Cl.
USPC .......................... 705/7.27; 705/7.11; 705/301

(58) Field of Classification Search
USPC .......................... 705/7.11–7.42, 301; 707/608
See application file for complete search history.

(56) References Cited

U.S. PATENT DOCUMENTS

| | | | | |
|---|---|---|---|---|
| 5,088,058 A * | 2/1992 | Salsburg | | 703/25 |
| 5,197,120 A * | 3/1993 | Saxton et al. | | 345/661 |
| 5,630,069 A * | 5/1997 | Flores et al. | | 705/7 |
| 5,734,837 A * | 3/1998 | Flores et al. | | 705/7 |
| 5,768,506 A * | 6/1998 | Randell | | 709/202 |
| 5,835,953 A * | 11/1998 | Ohran | | 711/162 |
| 5,999,911 A * | 12/1999 | Berg et al. | | 705/9 |
| 6,003,011 A * | 12/1999 | Sarin et al. | | 705/9 |
| 6,058,413 A * | 5/2000 | Flores et al. | | 718/101 |
| 6,073,109 A * | 6/2000 | Flores et al. | | 705/8 |
| 6,151,583 A * | 11/2000 | Ohmura et al. | | 705/8 |
| 6,189,016 B1 * | 2/2001 | Cabrera et al. | | 1/1 |
| 6,338,149 B1 * | 1/2002 | Ciccone et al. | | 714/38.12 |
| 6,381,610 B1 * | 4/2002 | Gundewar et al. | | 1/1 |
| 6,574,675 B1 * | 6/2003 | Swenson | | 719/316 |
| 6,826,579 B1 * | 11/2004 | Leymann et al. | | 717/131 |
| 6,968,343 B2 * | 11/2005 | Charisius et al. | | 1/1 |
| 6,993,761 B1 * | 1/2006 | Czajkowski et al. | | 718/100 |
| 7,184,966 B1 * | 2/2007 | Parsonnet et al. | | 705/8 |
| 7,225,208 B2 * | 5/2007 | Midgley et al. | | 1/1 |
| 7,310,653 B2 * | 12/2007 | Coyle et al. | | 1/1 |
| 7,386,532 B2 * | 6/2008 | Kiessig et al. | | 1/1 |
| 7,440,979 B2 * | 10/2008 | Strahl et al. | | 1/1 |
| 7,447,644 B2 * | 11/2008 | Brandt et al. | | 705/2 |
| 7,467,371 B1 * | 12/2008 | Meredith et al. | | 717/104 |
| 7,493,591 B2 * | 2/2009 | Charisius et al. | | 717/100 |
| 7,581,011 B2 * | 8/2009 | Teng | | 709/229 |
| 2002/0065798 A1 * | 5/2002 | Bostleman et al. | | 707/1 |
| 2002/0075293 A1 * | 6/2002 | Charisius et al. | | 345/704 |
| 2002/0077842 A1 * | 6/2002 | Charisius et al. | | 705/1 |
| 2002/0078432 A1 * | 6/2002 | Charisius et al. | | 717/102 |
| 2002/0129024 A1 * | 9/2002 | Lee | | 707/10 |
| 2002/0129078 A1 * | 9/2002 | Plaxton et al. | | 709/1 |
| 2002/0138543 A1 * | 9/2002 | Teng et al. | | 709/102 |
| 2002/0138577 A1 * | 9/2002 | Teng et al. | | 709/205 |
| 2002/0188597 A1 * | 12/2002 | Kern et al. | | 707/1 |

(Continued)

*Primary Examiner* — Alan S Miller
(74) *Attorney, Agent, or Firm* — Samad Aded; Hoffman Warncik LLC

(57) ABSTRACT

A workflow management system and method that includes approval of workflow changes. A workflow management system is disclosed that includes: a mapping system for mapping tier types to workflows; a modification system for changing tier types, wherein a tier type change causes a new workflow to replace an original workflow; a workflow snapshot system for taking a snapshot of the original workflow when the tier type change occurs; and an approval system for approving tier type changes.

18 Claims, 7 Drawing Sheets

(56) References Cited

U.S. PATENT DOCUMENTS

| | | | |
|---|---|---|---|
| 2003/0061266 A1* | 3/2003 | Ouchi | 709/106 |
| 2003/0105654 A1* | 6/2003 | MacLeod et al. | 705/7 |
| 2003/0195963 A1* | 10/2003 | Song et al. | 709/227 |
| 2003/0233374 A1* | 12/2003 | Spinola et al. | 707/104.1 |
| 2004/0083448 A1* | 4/2004 | Schulz et al. | 717/101 |
| 2004/0172445 A1* | 9/2004 | Singh et al. | 709/200 |
| 2004/0177226 A1* | 9/2004 | Chen | 711/162 |
| 2004/0243640 A1* | 12/2004 | Bostleman et al. | 707/104.1 |
| 2004/0267595 A1* | 12/2004 | Woodings et al. | 705/9 |
| 2004/0267835 A1* | 12/2004 | Zwilling et al. | 707/202 |
| 2004/0268338 A1* | 12/2004 | Gurpinar et al. | 717/169 |
| 2005/0027386 A1* | 2/2005 | Weigand et al. | 700/97 |
| 2005/0027582 A1* | 2/2005 | Chereau et al. | 705/9 |
| 2005/0033777 A1* | 2/2005 | Moraes et al. | 707/202 |
| 2005/0119911 A1* | 6/2005 | Ayan et al. | 705/1 |
| 2006/0047555 A1* | 3/2006 | Kang et al. | 705/9 |
| 2006/0070068 A1* | 3/2006 | Chandel | 718/100 |
| 2006/0143270 A1* | 6/2006 | Wodtke et al. | 709/206 |
| 2006/0206352 A1* | 9/2006 | Pulianda | 705/1 |
| 2006/0218366 A1* | 9/2006 | Fukuda et al. | 711/165 |
| 2006/0248371 A1* | 11/2006 | Chen et al. | 714/4 |
| 2007/0013943 A1* | 1/2007 | Sawayanagi et al. | 358/1.15 |
| 2007/0016432 A1* | 1/2007 | Piggott et al. | 705/1 |
| 2007/0156486 A1* | 7/2007 | Sanabria et al. | 705/8 |
| 2007/0261018 A1* | 11/2007 | Sanghvi et al. | 717/100 |
| 2008/0034017 A1* | 2/2008 | Giampaolo et al. | 707/204 |

* cited by examiner

FIG. 4

SYSTEM AND METHOD OF PROVIDING SNAPSHOT TO SUPPORT APPROVAL OF WORKFLOW CHANGES

FIELD OF THE INVENTION

The invention relates generally to workflow management, and more particularly to a workflow management system and method of approving workflow changes that includes taking a snapshot of an original workflow.

BACKGROUND OF THE INVENTION

Workflow management systems are extremely useful tools in managing tasks for different projects. Such tools allow the user to plan, view, and track tasks that are required to complete a given project. In more complex business scenarios, such tools may be required to simultaneously manage hundreds or even thousands of projects. In such cases, there may be hundreds of users that need to interact with the tool.

An example of such a scenario may involve a financial institution having thousands of different sites, e.g., data centers, offices, branches, automatic teller machines (ATMs), etc., that is undergoing a technology migration. In order to complete the migration, each site must undergo some transformation that can be tracked as a unique project. Each project has an associated set of tasks that must be completed, e.g., installing hardware, configuring databases, testing, etc. In such a scenario, there would typically be a relatively small number of different workflows that would be shared among each of the different projects based on the configuration or "tier type" of the site. For example, some of the offices may have T1 data lines, while others have fiber optics. Based on the configuration, a workflow would be assigned to the site.

One of the challenges in managing such a migration project is that it may not always be evident to a user what the configuration or tier type of the site is. For instance, an office may use a mix of technologies, e.g., fiber and T1, so the user may simply take their best guess. In this case, the organization may later find it necessary to change the tier type, and thus the workflow, in mid-stream. However, such changes could have far reaching implications in terms of overall schedule and workflow. Moreover, if a user changes the tier type, all of the workflow information about the original workflow would be lost. Accordingly, controls are required to ensure that such changes are correct.

SUMMARY OF THE INVENTION

The present invention addresses the above-mentioned problems, as well as others, by a workflow management system that includes an approval process for changing workflows. As part of the approval process, a snapshot of the original workflow is maintained in the event that a proposed workflow change is rejected.

In a first aspect, the invention provides workflow management system, comprising: a mapping system for mapping tier types to workflows; a modification system for changing tier types, wherein a tier type change causes a new workflow to replace an original workflow; a workflow snapshot system for taking a snapshot of the original workflow when the tier type change occurs; and an approval system for approving tier type changes.

In a second aspect, the invention provides a computer program product stored on a computer readable medium, which when executed provides a workflow management tool and includes: program code configured for mapping tier types to workflows; program code configured for allowing a user to change tier types, wherein a tier type change causes a new workflow to replace an original workflow; program code configured for taking a snapshot of the original workflow when the tier type change occurs; and program code configured for approving tier type changes.

In a third aspect, the invention provides a method of providing workflow management, comprising: assigning a tier type to a project; mapping the tier type to a workflow; changing the tier type, wherein a tier type change causes a new workflow to replace an original workflow; taking a snapshot of the original workflow when the tier type change occurs; and approving or rejecting the tier type change.

In a fourth aspect, the invention provides a method for deploying a workflow management system, comprising: providing a computer infrastructure being operable to: map tier types to workflows; allow a user to change tier types, wherein a tier type change causes a new workflow to replace an original workflow; take a snapshot of the original workflow when the tier type change occurs; and approve tier type changes.

BRIEF DESCRIPTION OF THE DRAWINGS

These and other features of this invention will be more readily understood from the following detailed description of the various aspects of the invention taken in conjunction with the accompanying drawings in which:

FIG. 4 depicts an interface for changing a tier type of a project in accordance with an embodiment of the present invention.

DETAILED DESCRIPTION OF THE INVENTION

Figure 1:
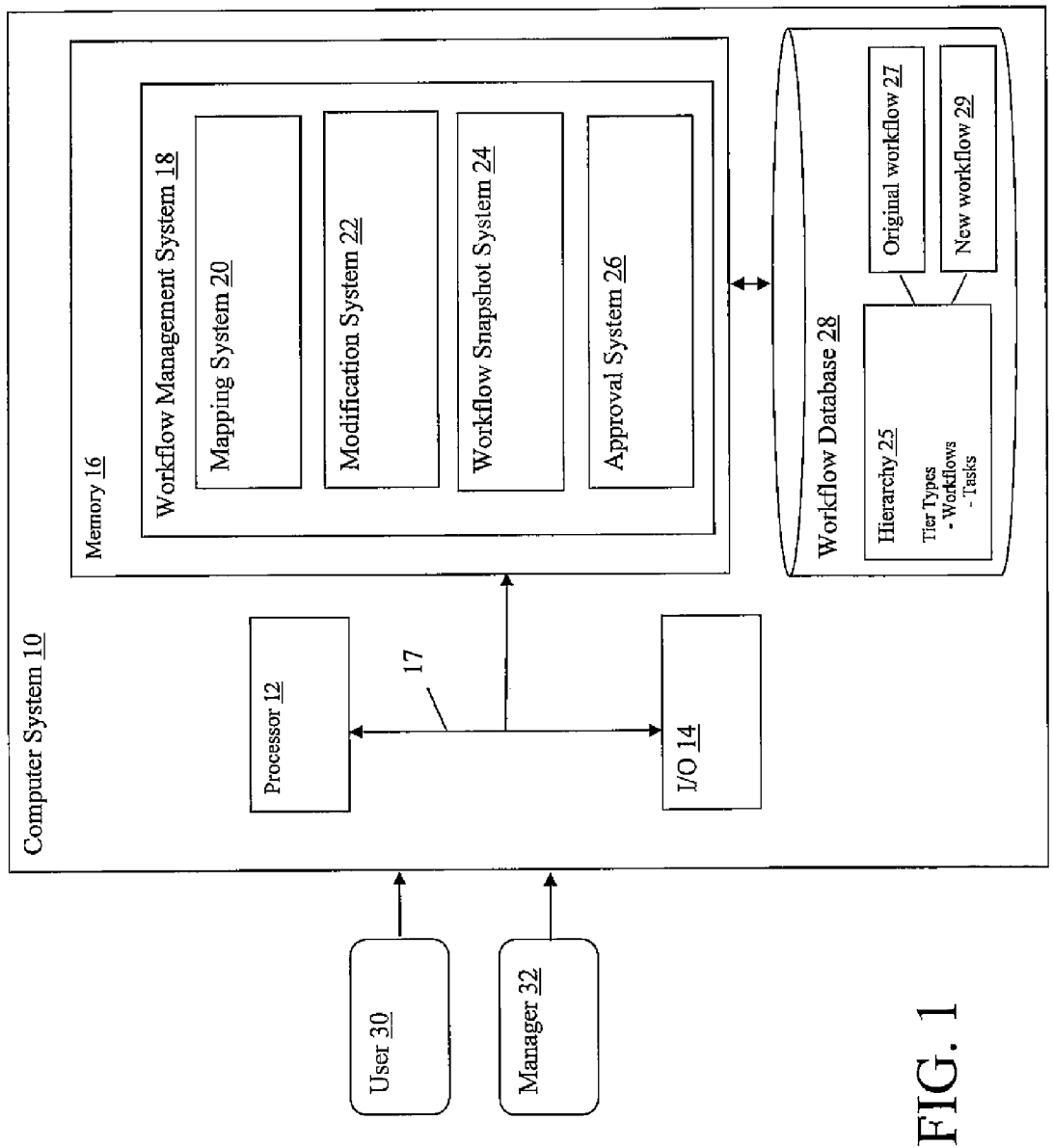
FIG. 1 depicts a computer system having a workflow management system in accordance with an embodiment of the present invention.

Referring now to drawings, FIG. 1 depicts a computer system 10 having a workflow management system 18 for managing workflows for an organization using information stored in a workflow database 28. Data in the workflow database 28 is organized as a hierarchy 25 by tier types, workflows, and tasks. Each tier type represents a particular class of items that is mapped to a workflow. In the example described above, tier types reflect technology configurations that need to be migrated (e.g., fiber optic office, T1 office, branch, ATM, etc.). One or more projects or sites (e.g., branch 1, branch 2, etc.) may share the same tier type. Each tier type is mapped to a workflow by mapping system 20. Note that more than one tier type may share the same workflow. Thus, each project or site is assigned a tier type, which is then mapped to a workflow. Each workflow includes a set of tasks that need to be completed. As described in more detail below, workflow management system 18 allows the user 30 to create a new workflow 29 to replace an original workflow 27. A snapshot of the original workflow 27 is temporarily stored in the workflow database 28 until the new workflow 29 is approved.

Figure 2:
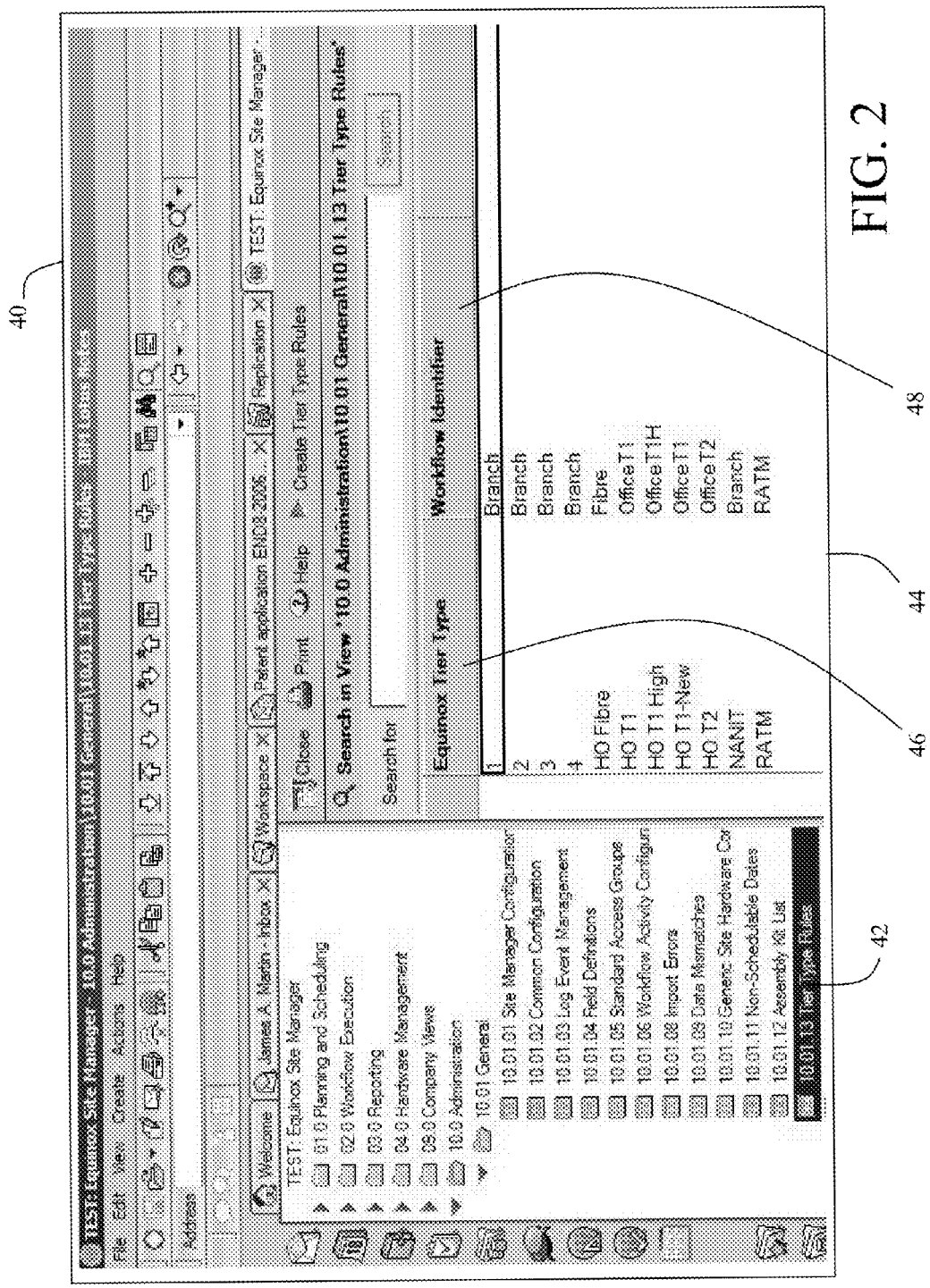
FIG. 2 depicts an interface showing a mapping between tier types and workflows in accordance with an embodiment of the present invention.

FIG. 2 depicts an illustrative interface 40 of a workflow management system 18. In this example, "tier type rules" 42 is selected, which displays a set of mapping rules in window 44. As can be seen, a set of tier types 46 are displayed, along with mappings to associated workflows 48. For instance, tier types 1, 2, 3, 4 are mapped to a "Branch", H0 Fibre is mapped to Fibre, etc.

Figure 3:
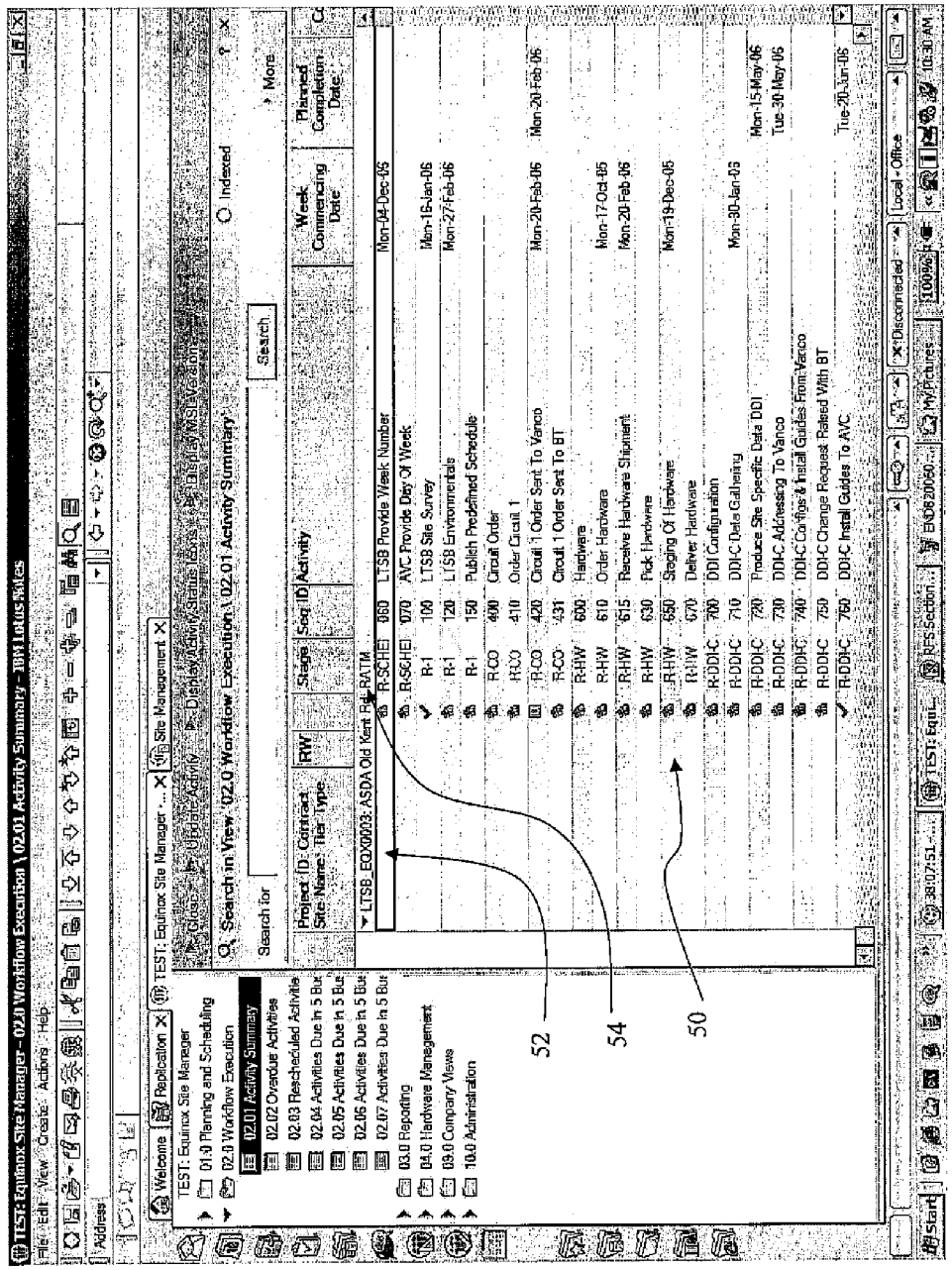
FIG. 3 depicts an interface showing a workflow in accordance with an embodiment of the present invention.

FIG. 3 depicts the workflow 50 for a selected site 52 (i.e., project), which has an RATM (remote Automatic Teller Machine) tier type 54. In this view, tasks that are completed are checked, tasks that are scheduled may include a calendar icon, and incomplete tasks include a reminder icon. Additional information, such as commence dates and planned completion dates can also be associated with each task. All of the information associated with the workflow is stored in workflow database 28 (FIG. 1).

Figure 4:
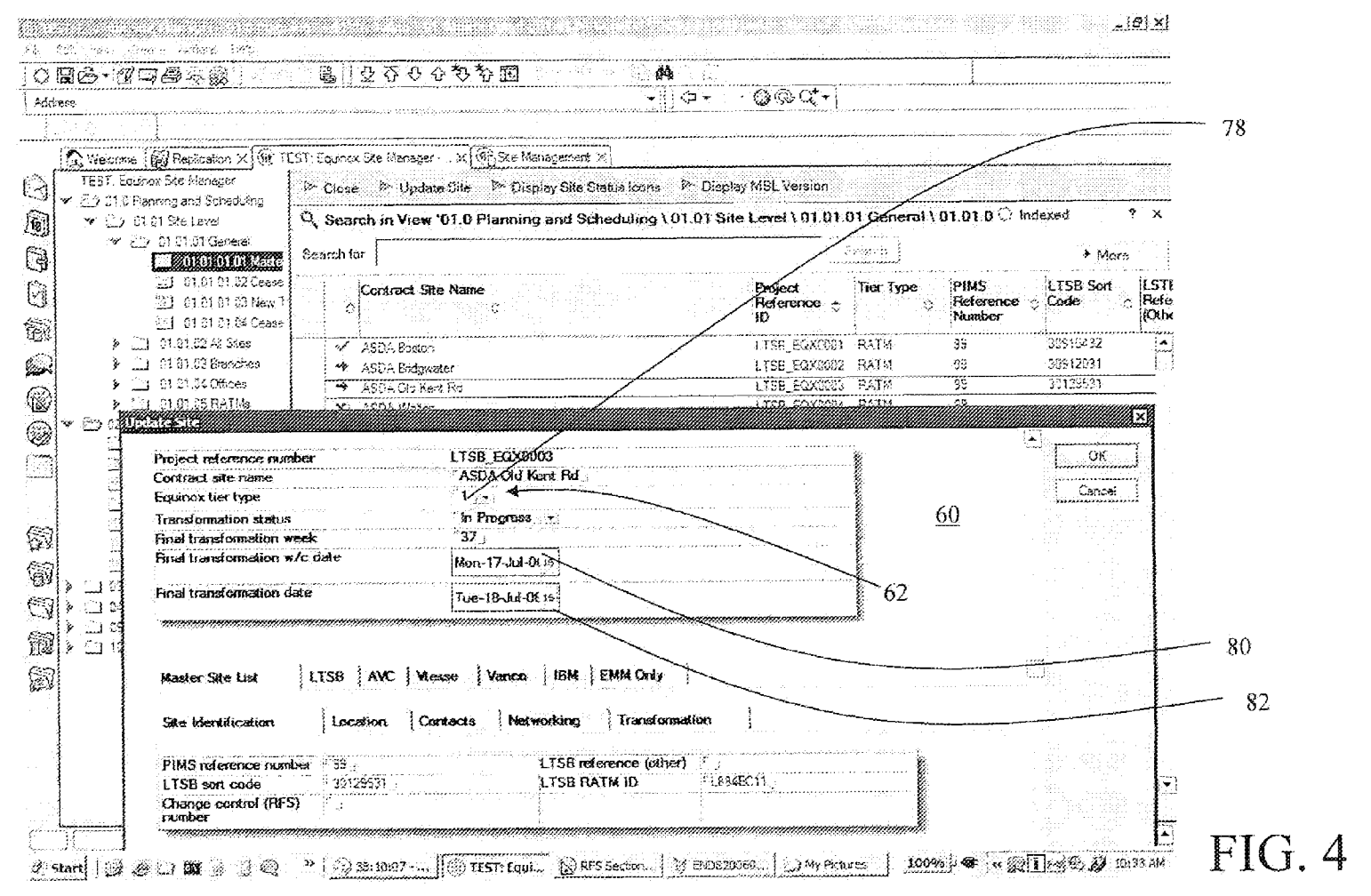
Figure 5:
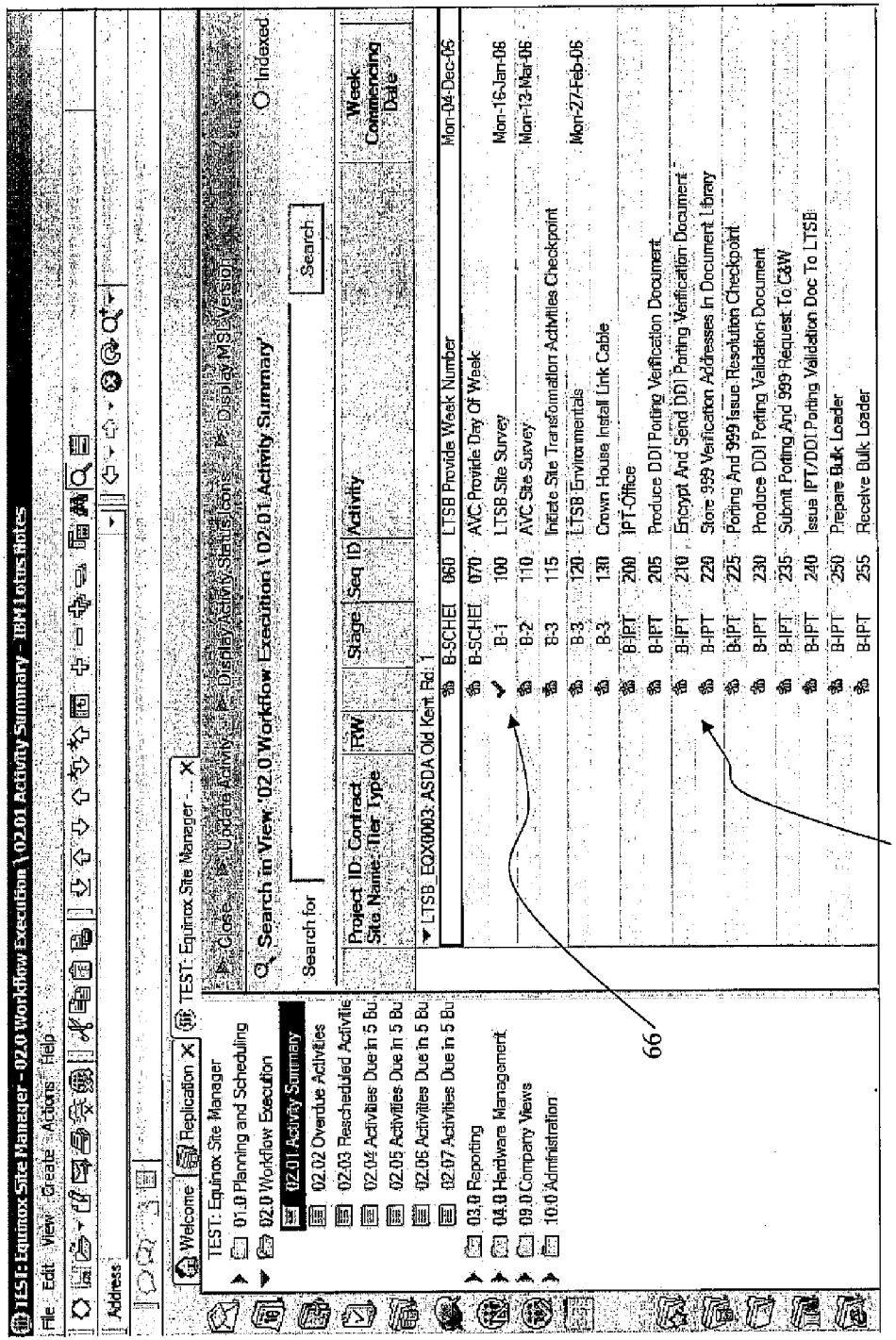
FIG. 5 depicts an interface showing a new workflow in accordance with an embodiment of the present invention.

As noted above, there may be instances where a user 30 believes that a particular project may have been assigned the wrong tier type. To address this, workflow management system 18 includes a modification system 22 for changing tier types (FIG. 1). An illustrative interface 60 for implementing such a change is shown in FIG. 4. Here, it can be seen that the user 30 can change the tier type designation 62 via a first dropdown box 78. In this case, the tier type has been changed from RATM to 1. The interface 60 also may include a first input drop down box 80 for the user 30 to input a final transformation week commencing date. Interface 60 may include a second input drop down box 82 for the user 30 to input a final transformation date. As shown in FIG. 5, when this change is made, a new workflow 64 for the project is generated. Note that any data related to tasks that is common to both the original and new workflow is retained by the new workflow 64. Thus, scheduling, status, etc., is transferred to the new workflow for common tasks. For example, it can be seen that task 66 is shown with a checkmark as complete since it was completed in accordance with the original workflow.

Note that while the user 30 is able to change the tier type to create a new workflow 29, the tier type change must be approved via approval system 26, e.g., by a manager 32, before it is officially accepted (FIG. 1). In the interim time between when a user 30 proposes a change and a manager 32 approves or rejects the change, the new workflow temporarily becomes the active workflow.

Figure 6:
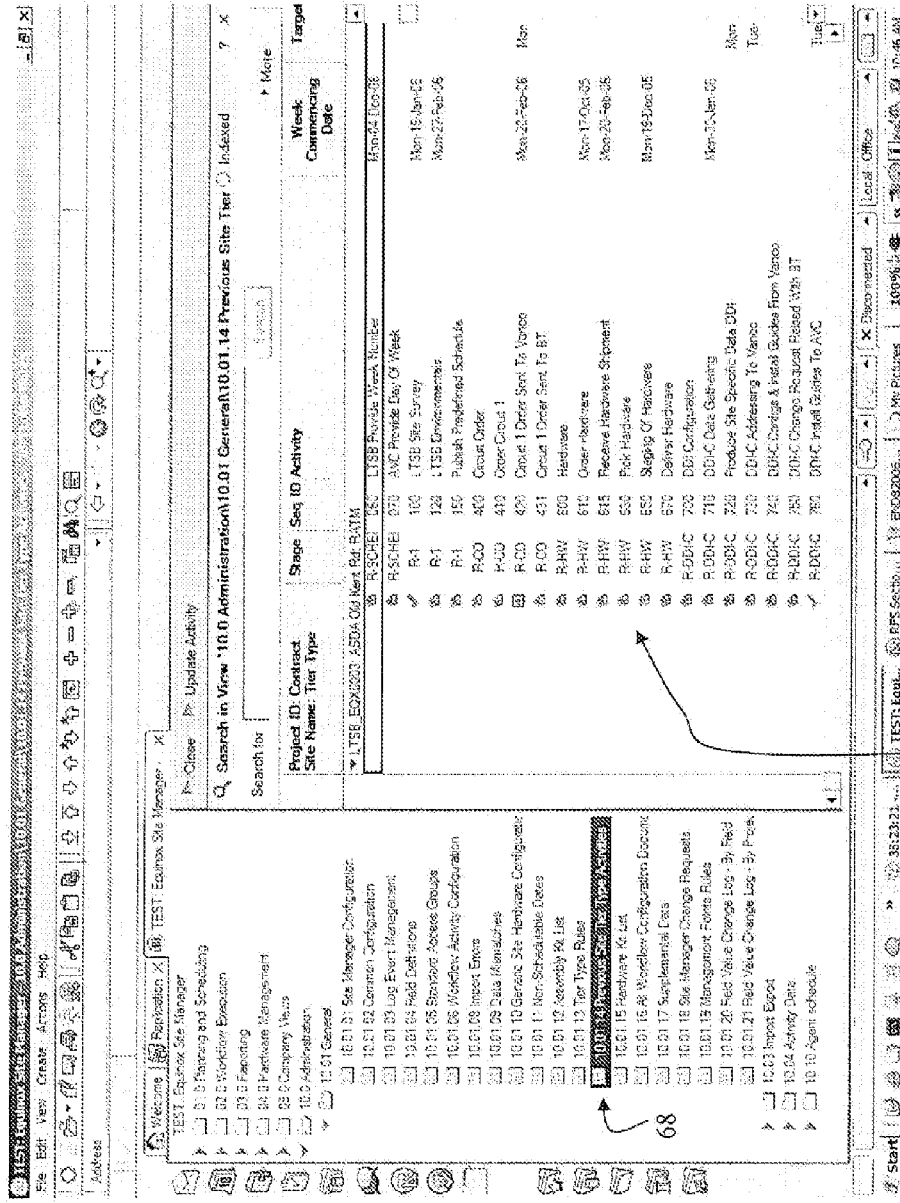
FIG. 6 depicts an interface showing a snapshot of an original workflow in accordance with an embodiment of the present invention.

If the change it is not approved, the original workflow 27 must be reinstated. In order to allow for reinstatement, a snapshot of the original workflow 27 is saved by workflow snapshot system 24 in the workflow database 28. FIG. 6 depicts an interface showing a saved original workflow 70, which is displayed by selecting the "Previous Site Tier Type Activities" link 68. The interface may display the snapshot of the original workflow 27 in response to a user 30 selecting a previous site tier type activities link 68 from a menu. In the event that the new tier type is approved, the original workflow is removed/deleted from the workflow database 28.

Figure 7:
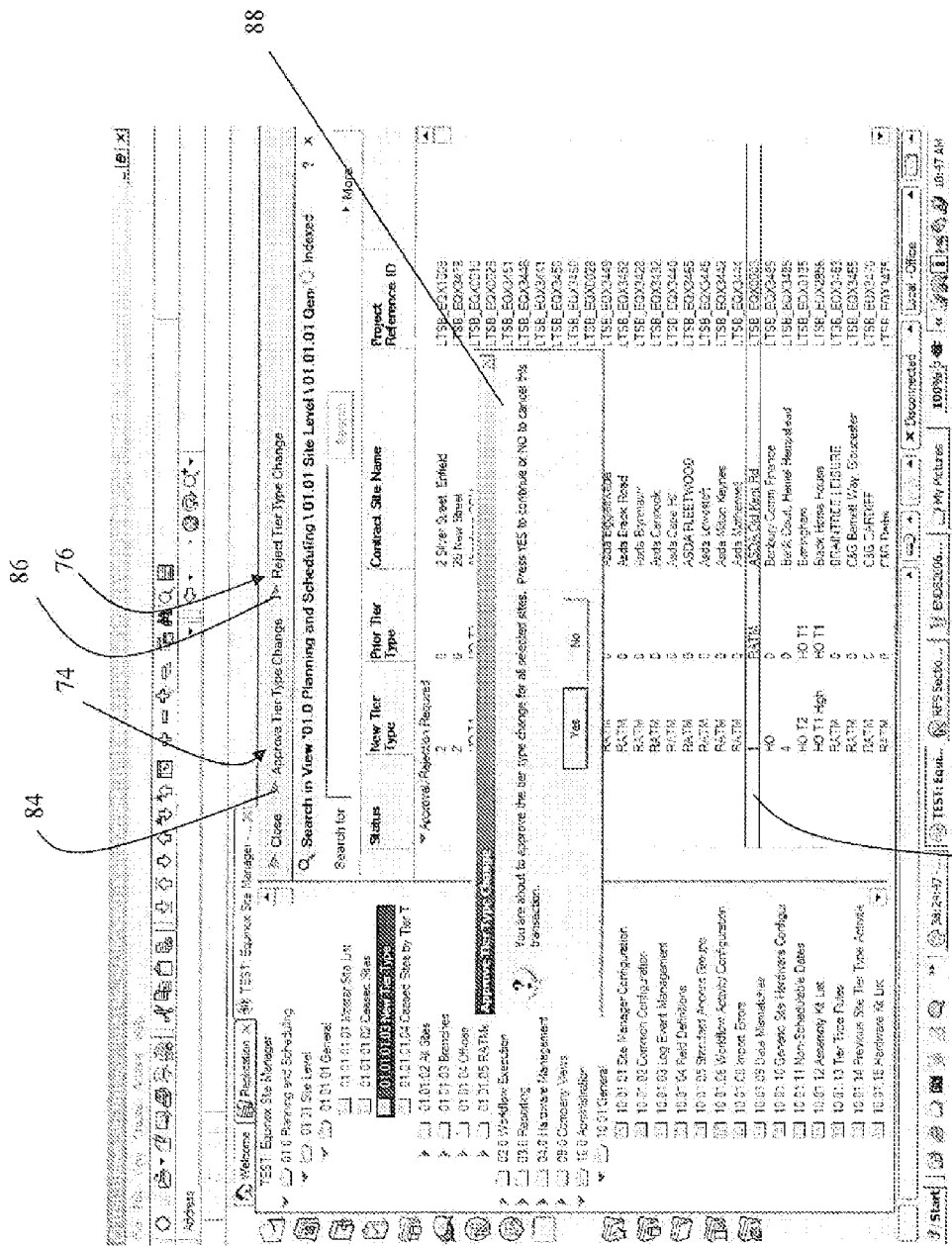
FIG. 7 depicts an interface for approving/rejecting a new tier type in accordance with an embodiment of the present invention.

FIG. 7 depicts an interface for approval system 26 that allows a manager 32 to selected a site 72, and either approve 74 or reject 76 the tier type change. The interface may include an approve tier type change button 84 and a reject tier type change button 86. The interface also may include a pop up window 88 for verifying the user's 30 selection to approve the tier type change or reject the tier type change. As noted, if the change is approved, the snapshot of the original workflow is removed. If the change is rejected, the original workflow is reinstated.

Referring again to FIG. 1, computer system 10 may comprise any type of computer, and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a workflow management system 18 could be created, maintained and/or deployed by a service provider that offers the functions described herein for customers. That is, a service provider could offer to provide workflow management having a tier modification approval process as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A workflow management system for managing an information technology migration, comprising:
   at least one computing device including:
      a modification system configured to receive from a user a change of a tier type assigned to one of a project or a site, wherein the tier type is associated with a workflow, wherein the workflow is a set of tasks for transitioning from a current technology configuration to a target technology configuration, wherein each tier type comprises a technology configuration of the project or the site corresponding to the information technology migration, and wherein the tier type change causes a new workflow to replace an original workflow;
      a workflow snapshot system configured to take a snapshot of the original workflow in direct response to the tier type change; and
      an approval system configured to approve or reject each tier type change, wherein the approval system is configured to delete the snapshot of the original workflow in direct response to approval of the tier type change and is configured to reinstate the snapshot of the original workflow in direct response to rejection of the tier type change.

2. The workflow management system of claim 1, wherein each workflow includes a plurality of tasks and associated data.

3. The workflow management system of claim 1, wherein a change in tier type causes the new workflow to become temporarily active until the tier type change is approved or rejected.

4. The workflow management system of claim 1, wherein a change in tier type causes information associated with tasks common between the new workflow and original workflow to be retained by the new workflow.

5. The workflow management system of claim 1, further comprising a first user interface including a first drop down box for the user to input the change of the tier type.

6. The workflow management system of claim 5, wherein the first user interface includes a second drop down box for the user to input a transformation status.

7. The workflow management system of claim 5, wherein the first user interface includes a first input box for the user to input a final transformation week commencing date.

8. The workflow management system of claim 5, wherein the first user interface includes a first input box for the user to input a final transformation date.

9. The workflow management system of claim 1, further comprising a second user interface for displaying the snapshot of the original workflow in response to a user selecting a previous site tier type activities from a menu.

10. The workflow management system of claim 1, further comprising a third user interface including an approve tier type change button and a reject tier type change button.

11. The workflow management system of claim 1, wherein the third user interface includes a pop up window for verifying the user's selection of approve tier type change or reject tier type change.

12. A computer program product stored on a non-transitory computer readable storage medium, which when executed provides a workflow management tool for managing an information technology migration and includes:
   program code configured for receiving from a user a change of a tier type assigned to one of a project or a site, wherein the tier type is associated with a workflow, wherein the workflow is a set of tasks for transitioning from a current technology configuration to a target technology configuration, wherein each tier type comprises a technology configuration of the project or the site corresponding to the information technology migration, and wherein the tier type change causes a new workflow to replace an original workflow;
   program code configured for taking a snapshot of the original workflow in direct response to the tier type change;
   program code configured for approving or rejecting each tier type change;
   program code configured for deleting the snapshot of the original workflow in direct response to approval of the tier type change; and
   program code configured for reinstating the snapshot of the original workflow in direct response to rejection of the tier type change.

13. The computer program product of claim 12, wherein each workflow includes a plurality of tasks and associated data.

14. The computer program product of claim 12, wherein a tier type change causes the new workflow to become temporarily active until the tier type change is approved or rejected.

15. The computer program product of claim 12, wherein a tier type change causes information associated with tasks common to both the new workflow and original workflow to be retained by the new workflow.

16. A method of for managing an information technology migration, comprising:
   receiving from a user, using a computing device, a change of a tier type assigned to one of a project or a site, wherein the tier type is associated with a workflow, wherein the workflow is a set of tasks for transitioning from a current technology configuration to a target technology configuration, wherein each tier type comprises a technology configuration of the project or the site corresponding to the information technology migration, and wherein the tier type change causes a new workflow to replace an original workflow;
   taking, using a computing device, a snapshot of the original workflow in direct response to the tier type change;
   approving or rejecting, using a computing device, the tier type change;
   deleting the snapshot of the original workflow in direct response to approval of the tier type change; and
   reinstating the snapshot of the original workflow in direct response to rejection of the tier type change.

17. The method of claim 16, wherein each workflow includes a plurality of tasks and associated data.

18. The method of claim 16, wherein a tier type change causes the new workflow to become temporarily active until the tier type change is approved or rejected.

* * * * *